United States Patent
Phipps

(10) Patent No.: US 8,757,101 B1
(45) Date of Patent: Jun. 24, 2014

(54) PET DIAPER

(76) Inventor: Donald Phipps, Sheboygan, WI (US)

(*) Notice: Subject to any disclaimer, the term of this patent is extended or adjusted under 35 U.S.C. 154(b) by 68 days.

(21) Appl. No.: 13/543,220

(22) Filed: Jul. 6, 2012

(51) Int. Cl.
*A01K 23/00* (2006.01)

(52) U.S. Cl.
CPC ...................................... *A01K 23/00* (2013.01)
USPC ........................................................ 119/868

(58) Field of Classification Search
USPC .................................................. 119/868, 867
See application file for complete search history.

(56) References Cited

U.S. PATENT DOCUMENTS

| | | | | |
|---|---|---|---|---|
| 2,247,431 | A * | 7/1941 | Behrens | 119/868 |
| 3,090,356 | A * | 5/1963 | Andrisani | 119/868 |
| 4,103,645 | A | 8/1978 | Tayler | |
| 4,269,148 | A | 5/1981 | Holley-Donawa | |
| 4,290,386 | A | 9/1981 | Eiriksson | |
| 4,353,330 | A * | 10/1982 | Baumgartner | 119/868 |
| 4,444,152 | A | 4/1984 | Berardo | |
| 4,502,417 | A * | 3/1985 | Jenkins | 119/868 |
| 4,510,887 | A | 4/1985 | Lincoln et al. | |
| 4,537,153 | A | 8/1985 | Vidal | |
| 4,709,661 | A | 12/1987 | Mayle, Jr. | |
| 4,969,419 | A | 11/1990 | Fong | |
| 5,005,525 | A | 4/1991 | Stanton | |
| 5,315,960 | A | 5/1994 | Lamp | |
| 5,355,836 | A | 10/1994 | Vallery | |
| 5,386,802 | A | 2/1995 | Hang-Fu | |
| 5,427,059 | A | 6/1995 | Logan | |
| 5,813,369 | A | 9/1998 | Fujinaga | |
| 5,819,691 | A | 10/1998 | Lavi et al. | |
| 6,647,928 | B1 * | 11/2003 | Spiller | 119/854 |
| 6,837,187 | B2 | 1/2005 | Berardo | |
| 6,941,897 | B1 | 9/2005 | Rosales | |
| 7,044,087 | B1 * | 5/2006 | Brecheen | 119/868 |
| 7,861,677 | B2 | 1/2011 | Habig | |
| 2004/0020446 | A1 * | 2/2004 | Paterson | 119/868 |
| 2004/0144334 | A1 * | 7/2004 | Berardo | 119/868 |
| 2006/0124076 | A1 * | 6/2006 | Tseng | 119/868 |
| 2007/0227466 | A1 * | 10/2007 | Tsai | 119/868 |
| 2011/0303162 | A1 * | 12/2011 | Morman | 119/858 |

FOREIGN PATENT DOCUMENTS

| | | | | | |
|---|---|---|---|---|---|
| DE | 4000702 | A1 * | 7/1991 | ............. | A01K 23/00 |
| EP | 986950 | A1 * | 3/2000 | ............. | A01K 23/00 |
| GB | 2410883 | A * | 8/2005 | ............. | A01K 23/00 |

* cited by examiner

*Primary Examiner* — Son T Nguyen
(74) *Attorney, Agent, or Firm* — Robert C. Montgomery; Montgomery Patent & Design

(57) ABSTRACT

A pet diaper adapted to be fastened around a pet's rear and under the tail, and to the pet's waist such that the pet diaper is securely positioned to receive and contain fecal droppings. The pet diaper comprises a frame structure which supports a container that is lined with a replaceable plastic bag. The pet diaper is affixed to the pet using adjustable straps which wrap around the pet's midsection and attach to the collar. The frame structure holds the bag away from the pet to prevent expelled fecal matter from getting on the pet's fur.

14 Claims, 3 Drawing Sheets

PET DIAPER

RELATED APPLICATIONS

There are currently no co-pending applications.

FIELD OF THE INVENTION

The presently disclosed subject matter relates to pet care products. More particularly, the present invention is directed to a diaper for pets.

BACKGROUND OF THE INVENTION

Normally dogs are let outside in a fenced in area or walked on a leash to allow them to take care of their bathroom duties. These methods provide mental and physical stimulation for the dog and enables them to satisfy some of their basic instincts such as the marking of their territory.

However, some dogs are too young, too old, or so sick that they may not have adequate control of their bodily functions. This translates into a mess inside a home or car. Additionally, city ordinances or neighborhood regulations may require that owners pick up the droppings of their canine friends during a neighborhood walk. Such can be a rather unpleasant task.

Accordingly, there is a need for a means by which one can effectively contain the droppings from their dogs without the mess and unpleasantness described above.

SUMMARY OF THE INVENTION

The principles of the present invention provide for a system and method by which a diaper-like device is fastened around a pet's rear legs and tail to contain and control fecal droppings.

The principles of the present invention provide for a pet diaper that includes a frame structure formed by an upper support structure having a horizontal "U" shape that is defined by a first strap to have horizontal legs and by a lower support structure having a vertical "U" shape defined by a second strap to have vertical legs and which are attached to the horizontal legs to form a continuous structure. The pet diaper further includes a plurality of bag clips attached around the horizontal "U" shape and a container that is affixed around the horizontal "U" shape. The pet diaper further includes a waist strap assembly having an elongated first adjustable strap attached at one end to the upper support structure and having a first loop fastener at its free end and an elongated second adjustable strap attached to the upper support structure and having a second loop fastener at its free end. The waist strap assembly further includes an elongated waist strap having a first end and a second end that are configured to fasten together to form an adjustable length third loop. Finally, the pet diaper includes an elongated adjustable length collar strap having a first end with a fourth loop fastener, a second end with a fifth loop fastener, and a clasp having eyelet.

The lower support structure is dimensioned to rest against the rear of a pet while the container extends away from the lower support structure to capture fecal matter. The system is attached to a pet by having the first, second, and fourth loop fasteners surround the waist strap while the third loop fastener is adjusted to cause the waist strap to fit around the pet. The fifth loop fastener is used to connect the eyelet.

In practice the container will retain a plastic bag that is held in place by the bag clips. The plastic bag should be cup-shaped and should include a pull-tie. Proper dimensioning will enable the plastic bag to line the container. Beneficially the container is made from a fabric. The various fastener systems can be hook-and-loop fasteners configured to enable adjustable length collar strap and waist straps. Ideally the container will be formed integrally with the upper support structure while the adjustable straps are affixed to the upper support structure using rivets.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | pet diaper |
| 20 | receiving assembly |
| 22 | fabric container |
| 24 | upper support structure |
| 25 | horizontal leg |
| 26 | lower support structure |
| 27 | vertical leg |
| 28 | bag clip |
| 30 | plastic bag |
| 32 | pull-tie |
| 34a | first tail strap |
| 34b | second tail strap |
| 36 | strap fastener |
| 50 | waist strap assembly |
| 52 | waist strap |
| 56a | first extension strap |
| 56b | second extension strap |
| 58a | first loop |
| 58b | second loop |
| 70 | collar strap |
| 72 | third loop |
| 74 | clasp |
| 76 | fourth loop |
| 80 | hook-and-loop fastener |
| 100 | pet |
| 105 | collar |

DETAILED DESCRIPTION OF THE PREFERRED EMBODIMENT

Figure 1:
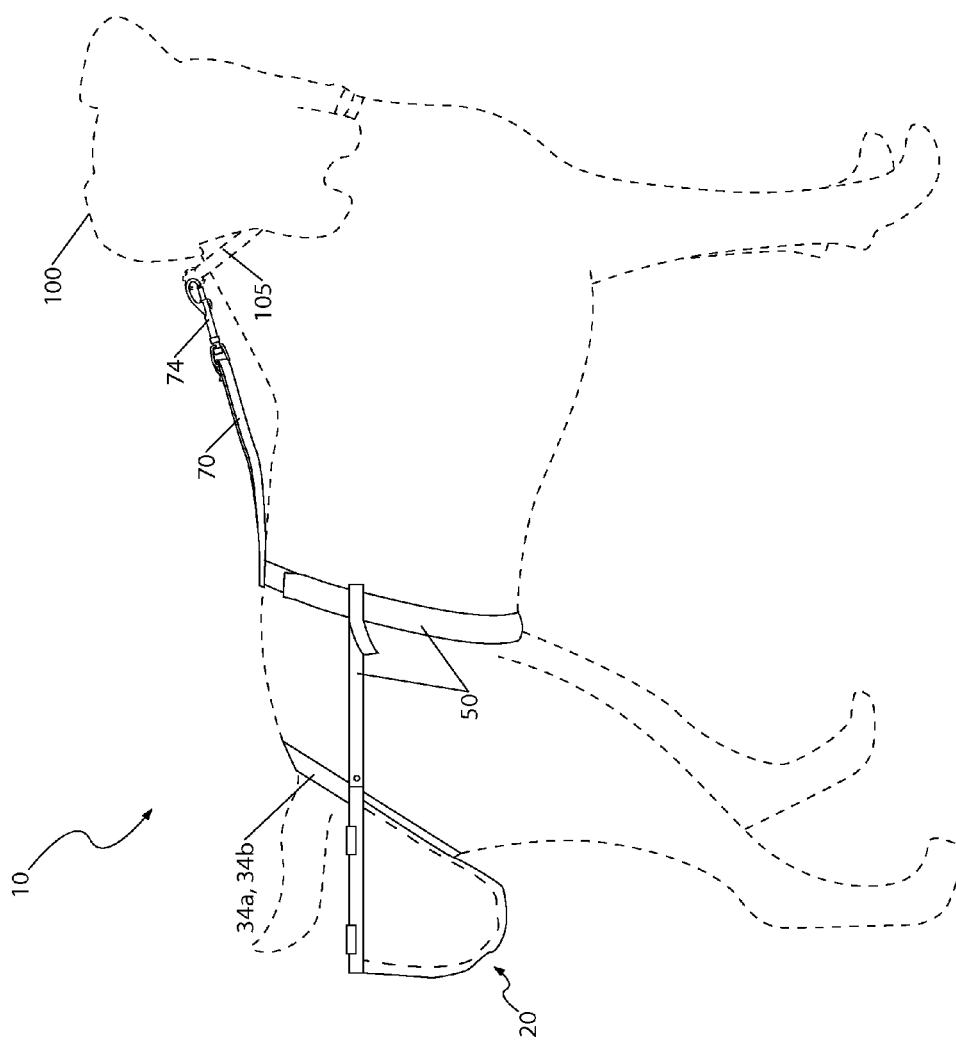
FIG. 1 is an environmental view of a pet diaper 10 according to a preferred embodiment of the present invention and which is depicted in an in-use state.
Figure 2:
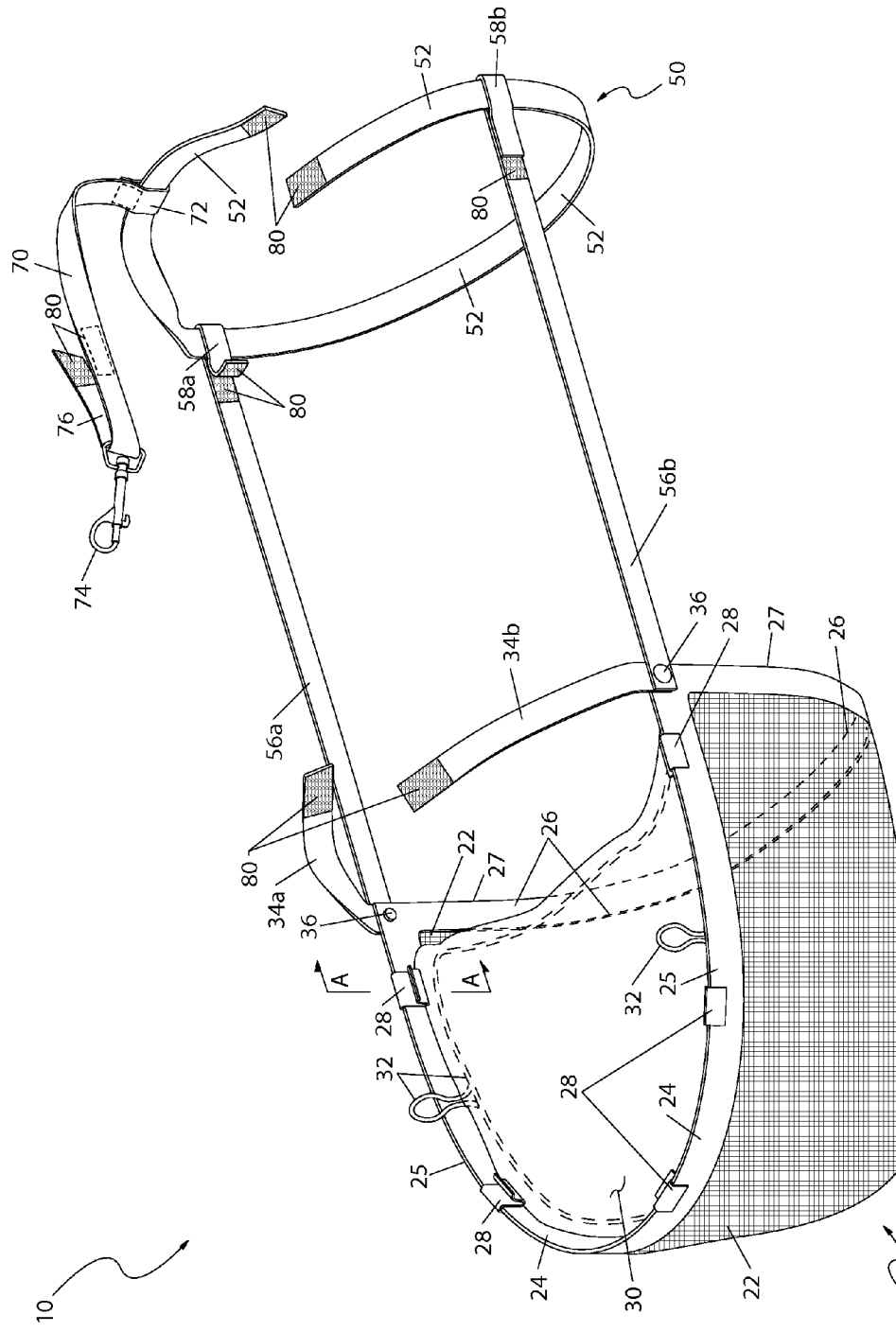
FIG. 2 is a perspective view of the pet diaper 10 illustrated in FIG. 1.
Figure 3:
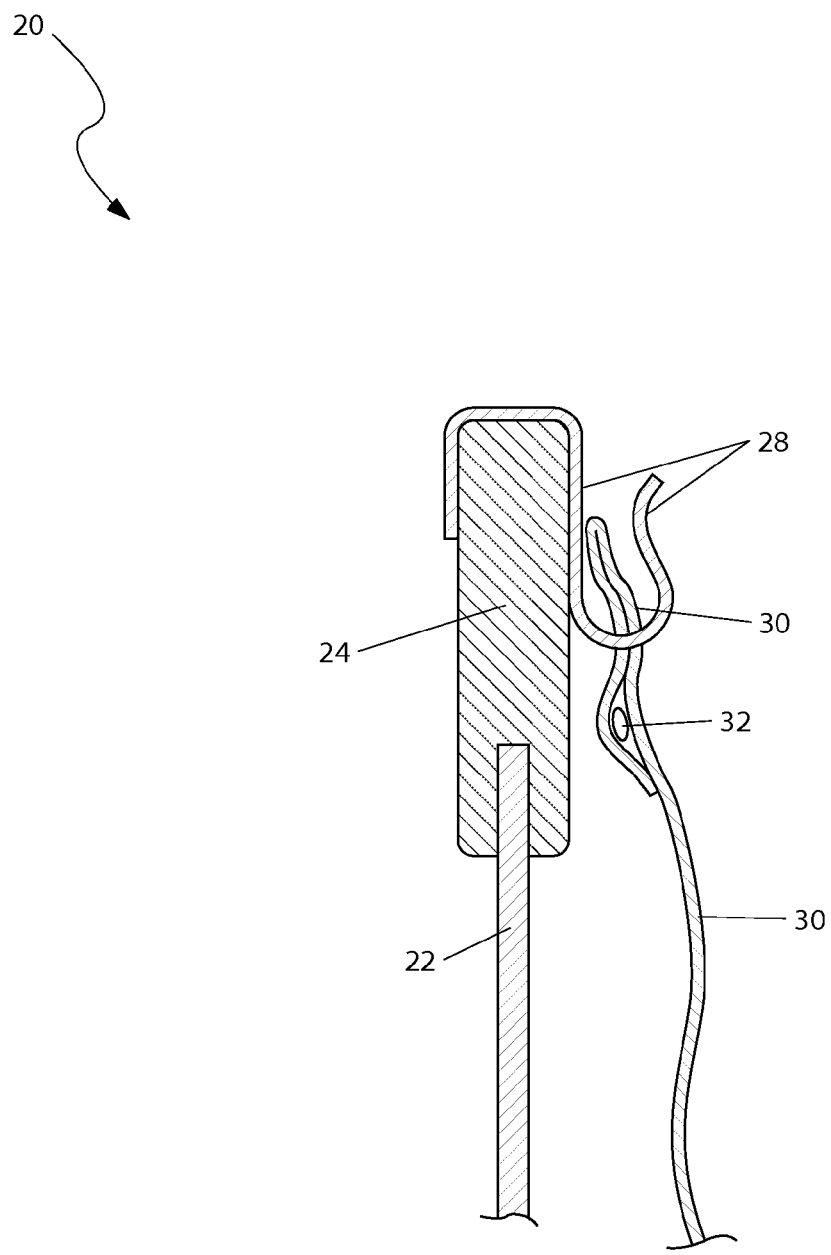
FIG. 3 is a section view of a bag clip 28 used in the pet diaper 10 shown in FIGS. 1 and 2.

The best mode for carrying out the invention is presented in terms of its preferred embodiment, herein depicted within FIGS. 1 through 3. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

FIG. 1 presents an environmental view of a pet diaper 10 that is in accord with the preferred embodiment of the present invention when depicted in an in-use state. The pet diaper 10 is designed to retain fecal matter from a pet 100 in a semi-rigid basket-shaped receiving assembly 20 until that fecal matter can be properly disposed of.

The pet diaper 10 includes the receiving assembly 20 which, referring now to FIG. 3, has an upper support structure 24 with an affixed integral fabric container 22. Referring now to FIGS. 1 and 3, the receiving assembly 20 is fastened around the rear legs and adjacent the tail of the pet 100 for the purpose of receiving fecal droppings in a replaceable plastic bag 30 that is located within the fabric container 22. The receiving assembly 20 is supported at the waist of the pet 100 and by a pet collar 105. To that end the pet diaper 10 provides adjustable straps (reference elements 34a, 34b, 50 which are described in more detail below) which are secured around the tail and waist of the pet 100 while providing adjustability via respective hook-and-loop fasteners 80, see FIG. 2, such as VELCRO®.

The pet diaper 10 is envisioned as being highly valuable in the care of very young, old, sick, or injured pets 100 that are unable to perform fecal duties in a normal manner. The use of the pet diaper 10 helps pet owners to avoid having to deal with indoor accidents, as well as normal cleanup of fecal droppings.

FIG. 2 presents a perspective view of the pet diaper 10. The pet diaper 10 includes the receiving assembly 20, a waist strap assembly 50, and a collar strap 70. The receiving assembly 20 includes a semi-rigid plastic two part support structure which helps extend the receiving assembly 20 away from the pet 100 to prevent fecal matter from getting on the pet's fur. That two-part support structure comprises a generally "U"-shaped upper support structure 24 and a generally "U"-shaped lower support structure 26, each of which are plastic molded frame loops.

Referring now to FIG. 2, the upper support structure 24 is comprised of a "U"-shaped plastic strip having side legs 25 that run horizontally forward to meet with the vertically running side legs 27 of the "U"-shaped lower support structure 26. The lower support structure 26 fits against the bottom waist of the pet 100 while the upper support structure extends past the rear legs of the pet 100. The upper 24 and lower 26 support structures are approximately one (1) inch wide and about one-eighth inch (⅛ in.) thick. The upper 24 and lower 26 support structures define a continuous and integrally molded attachment structure that supports the basket-shaped fabric container 22.

The fabric container 22 is envisioned as being comprised of rugged re-usable and washable materials such as cloth, vinyl, canvas, and the like. In use, the lower support structure 26 rests against the rear of the pet 100. This positions the receiving assembly 20 to receive the fecal matter within the fabric container 22 (also see FIG. 1). The upper support structure 24 enables attachment of the replaceable plastic bag 30 via a plurality of permanently attached bag clips 28 that are arranged equally-spaced along the top of the upper support structure 24 (also see FIG. 3).

The plastic bag 30 comprises a cup-shaped form that is envisioned as being made of an extruded or molded sheet plastic. The plastic bag 30 beneficially includes a pull-tie 32 that surrounds its upper edge which enables closure of the plastic bag 30. The plastic bag 30 is configured to line the fabric container 22. As the plastic bag 30 is positioned to receive fecal matter, it and its pull-tie 32 enables easy containment, removal, and disposal of the fecal matter. It is envisioned that a plurality of plastic bags 30 may be available for purchase by a user, being packaged singularly or in a role form, in a similar fashion as other plastic bag products being common in the industry.

Referring now to FIGS. 1 and 2, the waist strap assembly 50 includes a plurality of rugged nylon strapping segments which connect to and support the previously described receiving assembly 20. The waist strap assembly 50 extends in a forward direction to encompass the waist of the pet 100. The waist strap assembly 50 has a waist strap 52 and a pair of parallel connecting members including a first extension strap 56a and a second extension strap 56b.

Each extension strap 56a, 56b attaches at a proximal end to respective ends of the upper support structure 24 via respective strap fasteners 36, envisioned to be rivets or an equivalent fastener. The distal ends of the extension straps 56a, 56b attach to the waist strap 52 via a first loop 58a and second loop 58b. The loops 58a, 58b enable adjusting the distance between the upper support structure 24 and the waist strap 52 to accurately position the receiving assembly 20. The loops 58a, 58b form the ends of the extension straps 56a, 56b. The loops 58a 58b wrapped around opposing sides of the waist strap 52 to double back and become affixed to the extension straps 56a, 56b via hook-and-loop fasteners 80.

Still referring to FIGS. 1 and 2, the pet diaper 10 provides additional support for the receiving assembly 20 via the collar strap 70. The collar strap 70 attaches between the waist strap 52 and a collar 105 worn by the pet 100. The collar strap 70 includes a section of nylon strapping comprised of a similar material as the aforementioned waist strap assembly 50. The collar strap 70 is looped and sewn to form a third loop 72 having an opening suitable for insertion of the waist strap 52.

The collar strap 70 beneficially extends along the spine of the pet 100 and is connected to the collar 105 using an easily releasable clasp 74. The collar strap 70 has a fourth loop 76 that is looped through an eyelet of the clasp 74 and is fastened along the top of the collar strap 70 using additional hook-and-loop fasteners 80 as required to provide a way to adjust the length of the collar strap 70.

It is envisioned that the pet diaper 10 may be introduced in various scaled sizes such as small, medium, and large, so as to correspond to pets 100 having different sized frames, and as such a particular size should not be a limiting factor of the pet diaper 10. Furthermore, the pet diaper 10 is envisioned as being introduced in a variety of attractive colors to suit a user's preference.

FIG. 3 presents a section view of a bag clip 28 of the pet diaper 10. The fabric container 22 is preferably integrally molded into the lower surface of the upper support structure 24. Various attachment methods such as fasteners, adhesives, and the like may be utilized with equal benefit to attach the fabric container 22 to the upper support structure 24. Each bag clip 28 is affixed to an upper edge of the upper support structure 24 using a crimping method or an equivalent attachment means. Each bag clip 28 comprises a hook-shape and is positioned along an inside surface of the upper support structure 24 to retain the plastic bag 30 using a piercing, clamping, or hooking at multiple points around the upper support structure 24. However, it is understood that said hook-shaped bag clip 28 may be provided having different designs which also effectively attach the plastic bag 30, and as such should not be interpreted as a limiting factor of the pet diaper 10.

It is envisioned that other styles and configurations of the present invention can be easily incorporated into the teachings of the present invention, and while only one particular configuration is shown and described that is for purposes of clarity and disclosure and not by way of limitation of scope.

The preferred embodiment of the present invention can be utilized by the common user in a simple and effortless manner with little or no training. After initial purchase or acquisition of the pet diaper 10 it would be installed as indicated in FIG. 1.

The method of installing and utilizing the pet diaper 10 may be achieved by performing the following steps: procuring a particular model of the pet diaper 10 having a desired color and being of a size which corresponds to a user's pet 100; positioning the receiving assembly 20 below the tail of the pet 100 such that the upper support structure 24 is horizontal; attaching the hook-and-loop fasteners 80 of the first 34a and second 34b tail straps to position the receiving assembly 20 at a desired height; routing the waist strap 52 through the third loop 72 of the collar strap 70; wrapping the waist strap 52 around the waist of the pet 100; fastening the hook-and-loop fasteners 80 of the waist strap 52 to obtain a snug fit around the waist; wrapping the ends of the extension straps 56a, 56b around the sides of the waist strap 52; attaching the hook-and-loop fasteners 80 of the extension straps 56a, 56b to obtain a desired length; adjusting the extension straps 56a, 56b to properly position the receiving assembly 20; providing additional support to the receiving assembly 20 by fastening the clasp 74 of the collar strap 70 to an existing pet collar 105; adjusting the length of the collar strap 70 and securing that length by fastening the hook-and-loop fasteners 80; utilizing the pet diaper 10 to receive and contain fecal matter; disposing of the fecal matter by detaching the plastic bag 30 from the bag clips 28; closing the plastic bag 30 using the integral pull-tie 32; disposing of the plastic bag 30 and contained fecal matter in an appropriate receptacle; and, enabling a user to avoid dealing with indoor pet accidents as well as avoiding normal fecal matter cleanup while using the pet diaper 10.

It is envisioned that the pet diaper 10 may also be used while training puppies or kittens to be housebroken, or for pets 100 who are on long trips. The pet diaper 10 is envisioned to be valuable in the care of old, sick, or injured pets 100 that are unable to perform normal defecating duties in a conventional manner.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A pet diaper, comprising:
    an upper support structure having a horizontal "U" shape defined by a first strap to have horizontal legs;
    a lower support structure having a vertical "U" shape defined by a second strap to have vertical legs which are attached to said horizontal legs to form a continuous structure;
    a plurality of bag clips attached around said horizontal "U" shape;
    a container affixed around said horizontal "U" shape;
    a waist strap assembly having an elongated first adjustable strap affixed at one end to said upper support structure and having a first fastener system forming a first loop at its free end, an elongated second adjustable strap affixed to said upper support structure and having a second fastener system forming a second loop at its free end, and an adjustable elongated waist strap having a first end and a second end that are capable of fastening together using a third fastening system; and,
    an elongated adjustable length collar strap having a first end with a fourth fastener system forming a third loop, a second end with a fifth fastener system forming a fourth loop, and a clasp having eyelet;
    wherein said lower support structure is dimensioned to rest against the rear of a pet;
    wherein said container extends from said lower support structure;
    wherein said first loop surrounds said waist strap;
    wherein said second loop surrounds said waist strap;
    wherein said third loop surrounds to said waist strap; and,
    wherein said fourth loop surrounds said eyelet.

2. The pet diaper according to claim 1, further including a plastic bag retained within said container by said plurality of bag clips.

3. The pet diaper according to claim 2, wherein said plastic bag is cup-shaped and includes a pull-tie.

4. The pet diaper according to claim 3, wherein said plastic bag lines said container.

5. The pet diaper according to claim 1, wherein said container is comprised of a fabric.

6. The pet diaper according to claim 1, wherein said first, second, third, fourth, and fifth fastener systems are hook-and-loop fasteners.

7. The pet diaper according to claim 1, wherein said container is integral with said upper support structure.

8. The pet diaper according to claim 1, wherein said elongated first adjustable strap is affixed to said upper support structure with a rivet.

9. The pet diaper according to claim 1, wherein said elongated first adjustable strap is permanently affixed to said upper support structure with a rivet.

10. A pet diaper, comprising:
    an upper support structure having a horizontal "U" shape defined by a first strap to have horizontal legs;
    a lower support structure having a vertical "U" shape defined by a second strap to have vertical legs which are attached to said horizontal legs to form an integral frame structure;
    a plurality of bag clips attached said upper support structure;
    a container affixed around upper support structure;
    a waist strap assembly having an elongated first adjustable strap permanently affixed at one end to said upper support structure and having a first hook-and-loop system forming a first loop at a free end, an elongated second adjustable strap permanently affixed to said upper support structure and having a second hook-and-loop system forming a second loop at a free end, and an adjustable elongated waist strap having a first end and a second end that are capable of fastening together using a third hook-and-loop system; and,
    an elongated adjustable length collar strap having a first end with a fourth hook-and-loop system forming a third loop, a second end with a fifth hook-and-loop system forming a fourth loop, and a clasp having eyelet;
    wherein said lower support structure is dimensioned to rest against the rear of a pet;

wherein said container extends from said lower support structure;
wherein said first loop surrounds said waist strap;
wherein said second loop surrounds said waist strap;
wherein said third loop surrounds to said waist strap; and,
wherein said fourth loop surrounds said eyelet.

11. The pet diaper according to claim 10, further including a plastic bag retained within said container by said plurality of bag clips.

12. The pet diaper according to claim 11, wherein said plastic bag is cup-shaped and includes a pull-tie.

13. The pet diaper according to claim 12, wherein said plastic bag lines said container.

14. The pet diaper according to claim 10, wherein said container is comprised of a fabric.

* * * * *